US010311186B2

(12) United States Patent
Bravo et al.

(10) Patent No.: US 10,311,186 B2
(45) Date of Patent: Jun. 4, 2019

(54) THREE-DIMENSIONAL PATTERN RISK SCORING

(71) Applicant: GLOBALFOUNDRIES Inc., Grand Cayman (KY)

(72) Inventors: Jaime Bravo, Berkeley, CA (US);
Vikrant Chauhan, Cohoes, NY (US);
Piyush Pathak, Fremont, CA (US);
Shobhit Malik, San Jose, CA (US);
Uwe Paul Schroeder, Santa Cruz, CA (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 59 days.

(21) Appl. No.: 15/096,551

(22) Filed: Apr. 12, 2016

(65) Prior Publication Data

US 2017/0293704 A1 Oct. 12, 2017

(51) Int. Cl.
*G06F 17/50* (2006.01)

(52) U.S. Cl.
CPC ...... *G06F 17/5036* (2013.01); *G06F 17/5081* (2013.01); *G06F 2217/12* (2013.01); *Y02P 90/265* (2015.11)

(58) Field of Classification Search
CPC . G02B 27/22; G03F 7/0002; G06F 17/30598; G06F 11/2268; G06F 11/26

USPC .......... 716/50–56, 100–106, 139; 703/13–14
See application file for complete search history.

(56) References Cited

U.S. PATENT DOCUMENTS

| | | | | |
|---|---|---|---|---|
| 2004/0063009 A1* | 4/2004 | Phan | ............... | G03F 7/70525 430/30 |
| 2004/0147121 A1* | 7/2004 | Nakagaki | ............ | G03F 7/70683 438/689 |
| 2007/0118824 A1* | 5/2007 | Bae | ............... | G06F 17/504 716/52 |
| 2008/0058978 A1* | 3/2008 | Cain | ............... | G06F 17/5009 700/121 |
| 2009/0292387 A1* | 11/2009 | Funakoshi | ............ | G06F 3/0481 700/110 |
| 2010/0241261 A1* | 9/2010 | Taguchi | ............... | G03F 1/36 700/98 |
| 2012/0316855 A1* | 12/2012 | Park | ............... | G01N 21/9501 703/13 |

* cited by examiner

*Primary Examiner* — Nghia M Doan
(74) *Attorney, Agent, or Firm* — Ditthavong & Steiner, P.C.

(57) ABSTRACT

Methodologies and a device for assessing integrated circuit and pattern for yield risk based on 3D simulation of semiconductor patterns are provided. Embodiments include generating, with a processor, a 3D simulation of semiconductor patterns; obtaining critical dimensions of distances between layers or within a layer of the 3D simulation of semiconductor patterns; comparing the set of critical dimensions with predefined minimum dimensions; and yield scoring each of the semiconductor patterns of the 3D simulation based on the comparing step.

14 Claims, 4 Drawing Sheets

THREE-DIMENSIONAL PATTERN RISK SCORING

TECHNICAL FIELD

The present disclosure relates to a method and device for assessing quality of semiconductor patterns using three dimensional (3D) simulation. In particular, the present disclosure relates to three-dimensional pattern risk scoring for semiconductor devices in the 22 nanometer (nm) technology node and beyond.

BACKGROUND

Semiconductor process simulation is the modeling of the fabrication of semiconductor devices such as transistors. It is used as an alternative to physically taking cross sections of the semiconductor devices for quality analysis. A goal of process simulation is an accurate prediction of device geometry, active dopant distribution, stress distribution, etc. Process simulation is conventionally used as an input for device simulation, the modeling of device electrical characteristics.

The fabrication of integrated circuit devices requires a series of processing steps called a process flow. Process simulation involves modeling all essential steps in the process flow in order to obtain dopant and stress profiles and, to a lesser extent, device geometry. The input for process simulation is the process flow and a layout. The layout is selected as a linear cut in a full layout for a two-dimensional (2D) simulation or a rectangular cut from the layout for a 3D simulation.

2D simulation has limitation relating to parameter inputs and is used for the design of the semiconductor devices, but not used for the manufacture of the semiconductor devices. Moreover, 2D simulation approaches fail to capture risks associated with inter- or intra-layer spacing in semiconductor patterns due to limitations of process window space.

A need therefore exists for methodology and an apparatus for generating a yield score that factors in both design and manufacturing to arrive at a risk factor based on realistic 3D simulation of semiconductor patterns.

SUMMARY

One aspect of the present disclosure is a method and apparatus to assess integrated circuit and pattern for yield risk based on 3D simulation of semiconductor patterns. Another aspect includes the capability of yield scoring of individual 3D patterns to build integrated circuit (IC) yield models. Yet another aspect includes optimizing parameters for design and process improvements by using a risk scoring for improved silicon yield. Additional aspects in assessing 3D risk of a process window of a design and of an alternate design solution.

Additional aspects and other features of the present disclosure will be set forth in the description which follows and in part will be apparent to those having ordinary skill in the art upon examination of the following or may be learned from the practice of the present disclosure. The advantages of the present disclosure may be realized and obtained as particularly pointed out in the appended claims.

According to the present disclosure, some technical effects may be achieved in part by a method including: generating, with a processor, a 3D simulation of semiconductor patterns; obtaining critical dimensions of distances between layers or within a layer of the 3D simulation of semiconductor patterns; comparing the set of critical dimensions with predefined minimum dimensions; and yield scoring each of the semiconductor patterns of the 3D simulation based on the comparing step.

Aspects of the present disclosure include generating an IC model based on the yield scoring of each of the semiconductor patterns of the 3D simulation. Some aspects are including in the IC yield model optimized parameters from design and process improvements. Other aspects include normalizing an overall yield score to a volume of the 3D simulation of semiconductor patterns and translating into a risk factor. In certain aspects, the risk factor is a direct measure of a yield probability of the IC model. Further aspects include creating a 2D pattern risk assessment derived from the IC model for yield forecasting. Yet further aspects include identifying an at risk pattern prior to processing the IC model. Other aspects include substituting the at risk pattern with an acceptable pattern, wherein the acceptable pattern has a lower risk factor than the at risk pattern. Additional aspects include yield scoring with non-linear models. Further aspects include obtaining critical dimensions by obtaining a distance between adjacent conductors. Still further aspects include the 3D simulation of semiconductor patterns representing an actual process outcome on a wafer.

Another aspect of the present disclosure is a device including a 3D simulator that generates a 3D simulation of semiconductor patterns; a processor configured to: obtain critical dimensions of distances between layers or within a layer of the 3D model of semiconductor patterns; compare the set of critical dimensions with predefined minimum dimensions; and yield score each of the semiconductor patterns of the 3D simulation based on the comparing step.

Aspects of the present disclosure include the processor being further configured to: yield score each of the semiconductor patterns of the 3D simulation to generate an IC model. Other aspects include the IC yield model including optimized parameters from design and process improvements. Yet further aspects include an overall yield score being normalized to a volume of the 3D simulation of semiconductor patterns and translated into a risk factor. Additional aspects include the risk factor being a direct measure of a yield probability of the IC model. Some aspects include the processor being further configured to create a 2D pattern risk assessment derived from the IC model for yield forecasting. Other aspects include the processor being further configured to identify an at risk pattern prior to processing the IC model; and substitute the at risk pattern with an acceptable pattern, wherein the acceptable pattern has a lower risk factor than the at risk pattern.

Yet another aspect of the present disclosure is method including generating, with a processor, a 3D simulation of semiconductor patterns representing an actual process outcome on a wafer; obtaining critical dimensions of distances between layers or within a layer of the 3D simulation of semiconductor patterns; comparing the set of critical dimensions with predefined minimum dimensions; yield scoring each of the semiconductor patterns of the 3D simulation based on the comparing step to generate an IC model; normalizing an overall yield score to a volume of the 3D simulation of semiconductor patterns and translating it into a risk factor; identifying an at risk pattern prior to processing the IC model; and substituting the at risk pattern with an acceptable pattern, wherein the acceptable pattern has a lower risk factor than the at risk pattern.

Aspects of the present disclosure include the risk factor being a direct measure of a yield probability of the IC model.

Additional aspects and technical effects of the present disclosure will become readily apparent to those skilled in the art from the following detailed description wherein embodiments of the present disclosure are described simply by way of illustration of the best mode contemplated to carry out the present disclosure. As will be realized, the present disclosure is capable of other and different embodiments, and its several details are capable of modifications in various obvious respects, all without departing from the present disclosure. Accordingly, the drawings and description are to be regarded as illustrative in nature, and not as restrictive.

BRIEF DESCRIPTION OF THE DRAWINGS

The present disclosure is illustrated by way of example, and not by way of limitation, in the figures of the accompanying drawing and in which like reference numerals refer to similar elements and in which.

DETAILED DESCRIPTION

In the following description, for the purposes of explanation, numerous specific details are set forth in order to provide a thorough understanding of exemplary embodiments. It should be apparent, however, that exemplary embodiments may be practiced without these specific details or with an equivalent arrangement. In other instances, well-known structures and devices are shown in block diagram form in order to avoid unnecessarily obscuring exemplary embodiments. In addition, unless otherwise indicated, all numbers expressing quantities, ratios, and numerical properties of ingredients, reaction conditions, and so forth used in the specification and claims are to be understood as being modified in all instances by the term "about."

Figure 1B:
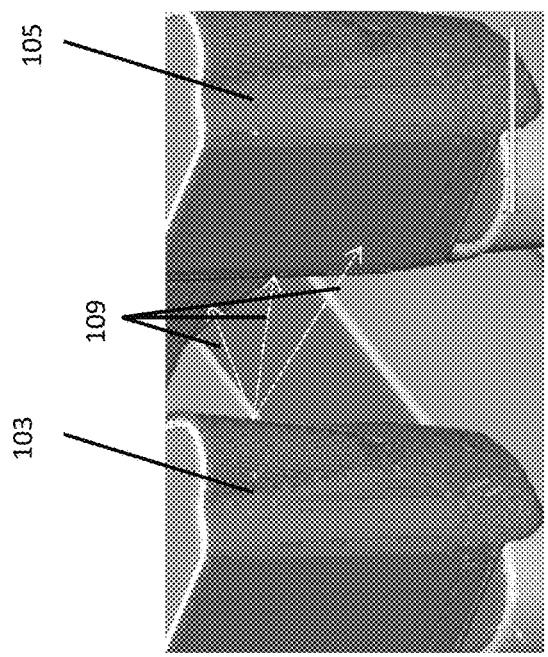
FIGS. 1A and 1B illustrate a computer generated 3D simulation of a semiconductor pattern, according to an exemplary embodiment.
Figure 1A:
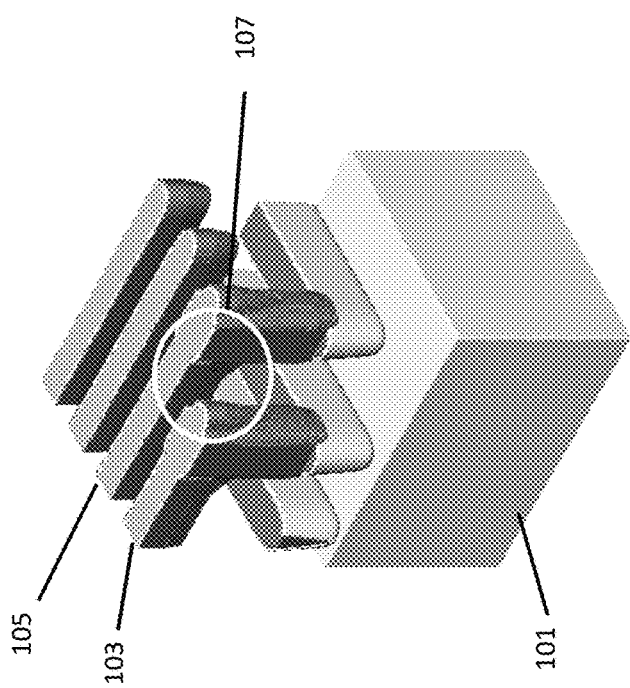

FIG. 1A illustrates an example of a computer generated 3D simulation of an exemplary semiconductor pattern to be assessed for risk by 3D modeling software. This semiconductor pattern represents an actual process outcome on a silicon (Si) wafer. In this example, the substrate 101 is shown with conductors 103 and 105 formed over the substrate 101. Distances between conductors 103 and 105 are collected by the 3D modeling software. The region included within circle 107 is shown in larger view in FIG. 1B.

In the example of FIG. 1B, multiple distances 109 are calculated between conductors 103 and 105. However, distances 109 between different structures of the semiconductor pattern are also collected by the 3D modeling software, and the distances 109 can be obtained in a horizontal plane or non-horizontal plane. Critical distances between layers of the semiconductor pattern or within a layer of the semiconductor pattern are collected by the 3D modeling software.

In accordance with the present disclosure, scoring is based on measurements between physical features where the minimum distance is not necessarily in a horizontal plane. This feature is a significant improvement over existing technology which cannot obtain measurements outside of a horizontal plane. In certain examples, critical dimensions can be obtained by obtaining a distance between a tapered via and an adjacent metal line corner, wherein a minimum distance vector is angled in 3D space. This minimum distance would not be seen with existing technology which would perform horizontal slices and measurements and would provide inaccurate results that indicate that the 3D structure passes minimum distance criterion, when in fact the minimum distance criterion is not necessarily being met.

The overall score of all critical inter and intra layer relations is calculated, normalized to the volume of the 3D space investigated, and translated into a risk factor. Different risk metric models such as Bose Einstein, Poisson or other non-linear models can be used. An algorithm of the following formula is used to quantify the risk factor:

$$R_f = 1 - A_n/D_n$$

$D_n$ represents the minimum predetermined rule for a given measurement within the semiconductor pattern. $A_n$ is the actual distance measured between layers of the semiconductor pattern or within a layer of the semiconductor pattern. $R_f$ is the derived risk factor. The objective is to have a risk factor of 0. As an example, if a $D_n$ is equal to 10, and $A_n$ is equal to 9, the local risk metric is $1 - 9/10 = 0.1$. As another example, if $D_n$ is equal to 15, and $A_n$ is equal to 20, the local risk metric is $1 - 1 = 0$ (noting that if the actual distance is greater than the minimum predetermined rule, then the metric is 0 by definition). Thus, in these examples, the minimum dimensions are compared to process assumptions and a score is derived, depending on how the minimum measured dimension compares to predefined specifications. A set of critical dimensions in a 3D space between layers or within one layer is defined and measured using a 3D simulation which represents the actual process outcome on a wafer. The risk factor is a direct measure of the yield probability of the assessed design. Therefore, design elements can be scored and the manufacturing and yield risk of a larger, compiled design can be assessed by a calculation of an overall score.

In certain embodiments, the 3D modeling can provide a different yield score for the same process window (PW). For the same PW, the score should be normally distributed, and an overall process window risk may be estimated through a process similar to the cumulative distribution function (CDF). PW risk may be assessed by CDF or normal distribution. The overall risk may be reduced by either a design or a process improvement.

Figure 2A:
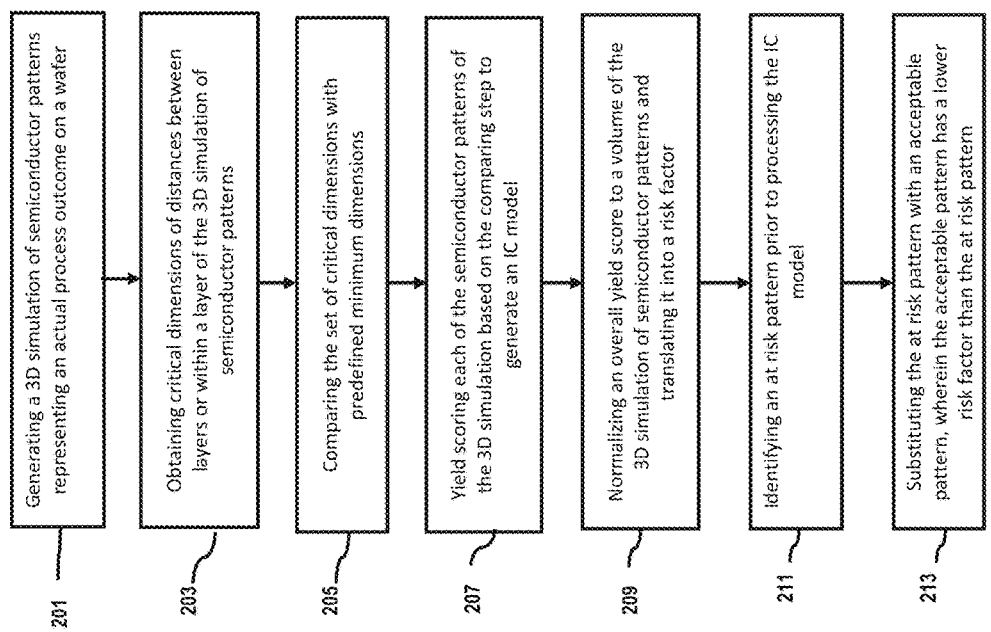
FIG. 2A illustrates a pattern risk scoring process flow, according to an exemplary embodiment.

A pattern risk scoring process flow according to an exemplary embodiment is shown in FIG. 2A. In Step 201, a 3D simulation of semiconductor patterns is generated by a programmed processor. The 3D simulation of semiconductor patterns represents an actual process outcome on a wafer. In Step 203, critical dimensions of distances between layers or within a layer of the 3D simulation of semiconductor patterns are obtained by the processor(s) programmed with 3D modeling software. In Step 205, the set of critical dimensions is compared with predefined minimum dimensions, using the algorithm described above. In Step 207, yield scoring is then performed on each of the semiconductor patterns of the 3D simulation based on the comparison made in Step 205 to generate an IC model. With Step 209, an overall yield score is normalized to a volume of the 3D simulation of semiconductor patterns and translated into a risk factor. In Steps 211 and 213, an at risk pattern can be identified prior to processing the IC model, and the at risk pattern can be substituted with an acceptable pattern having a lower risk factor than the at risk pattern.

Figure 2B:
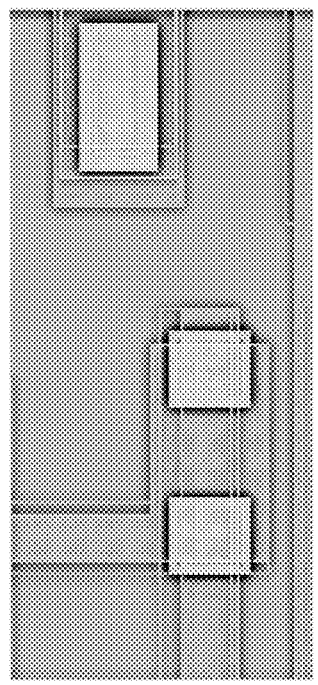
FIGS. 2B and 2C illustrate 2D patterns with different 3D risk factors, according to an exemplary embodiment.
Figure 2C:
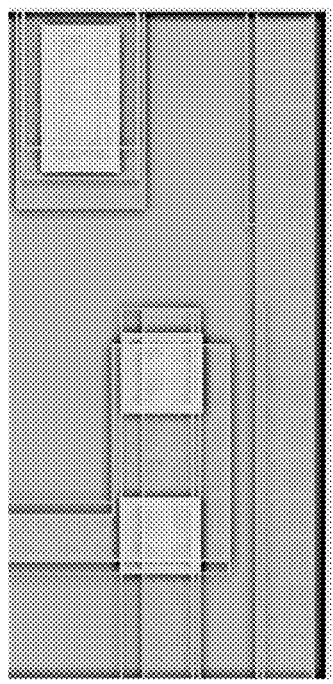

In FIGS. 2B and 2C, two different 2D patterns are illustrated with different 3D risk factors. In this example, the 2D pattern of FIG. 2B has a risk factor of 0.1, whereas the 2D pattern of FIG. 2C has a higher risk factor of 0.8. Therefore, with the 3D pattern risk scoring, the 2D pattern with the lower risk factor (FIG. 2B) would be selected. In other words, the 2D pattern having the higher risk factor is substituted with the 2D pattern with the lower risk factor.

Figure 3:
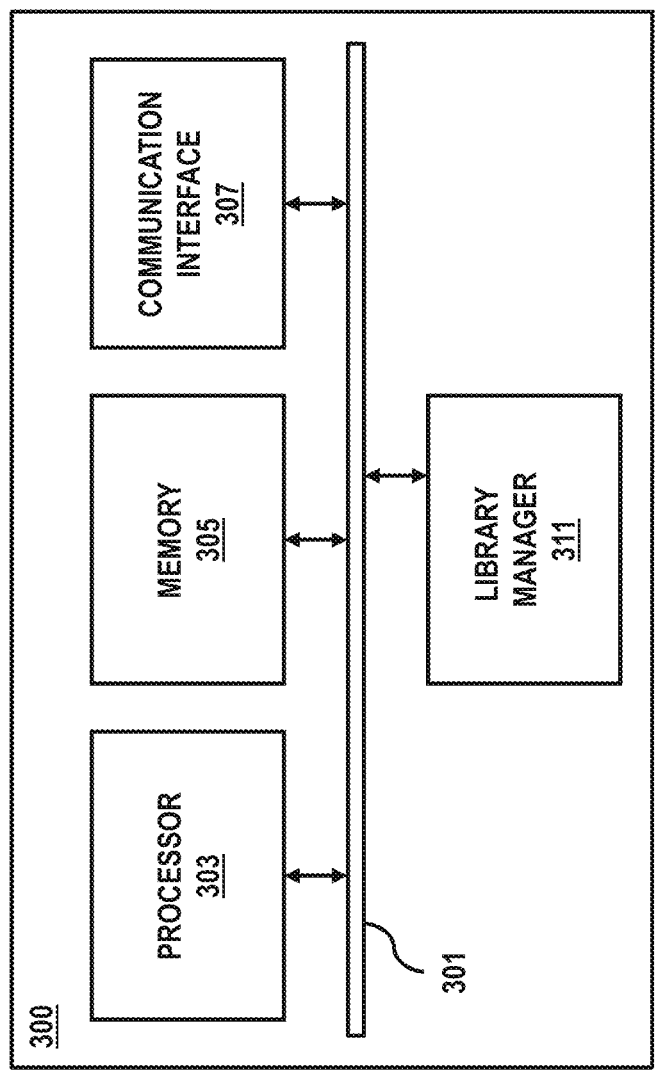
FIG. 3 schematically illustrates a computer system for performing 3D pattern risk scoring, in accordance with an exemplary embodiment.

FIG. 3 schematically illustrates a computer system 300 upon which an exemplary embodiment of the invention may be implemented. Computer system 300 may, for instance, be programmed (e.g., via computer program code or instructions) to initiate 3D simulation of semiconductor patterns representing an actual process outcome on a wafer (FIGS. 1A and 1B) and to obtain critical dimensions of distances between layers or within a layer of the 3D model of semiconductor patterns; compare the set of critical dimensions with predefined minimum dimensions; and yield score each of the semiconductor patterns of the 3D simulation based on the comparison, as described herein, and may include a communication mechanism such as a bus 301 for passing information between other internal and external components of the computer system 300. Moreover, computer system 300 may include a processor (or multiple processors) 303 for performing a set of operations on information as specified by computer program code related to 3D simulation and yield scoring. The computer system is equipped with a graphics card. Computer system 300 may also include memory 305 coupled to bus 301. The memory 305 may, for instance, include dynamic storage, static storage, or a combination thereof for storing yield scoring of individual 3D patterns to build IC yield models.

Processor 303 may further perform operations including normalizing an overall yield score to a volume of the 3D simulation of semiconductor patterns and translating it into a risk factor; identifying an at risk pattern prior to processing the IC model; and substituting the at risk pattern with an acceptable pattern. By way of example, based on computer program code in memory 305, processor 303 may interact with communication interface 307. Library Manager 311 may optionally create a library of low risk patterns that may be used for future IC designs of a given technology.

It is noted that, in various aspects, some or all of the techniques described herein are performed by computer system 300 in response to processor 303 executing one or more sequences of one or more processor instructions contained in memory 305. Such instructions, also called computer instructions, software and program code, may be read into memory 305 from another computer-readable medium such as a storage device or a network link. Execution of the sequences of instructions contained in memory 305 causes processor 303 to perform one or more of the method steps described herein. In alternative embodiments, hardware, such as application-specific integrated circuits (ASICs), may be used in place of or in combination with 3D modeling software to implement the invention. Thus, embodiments of the invention are not limited to any specific combination of hardware and software, unless otherwise explicitly stated herein.

The embodiments of the present disclosure can achieve several technical effects including the ability to merge both the process parameters and design parameters into a single risk factor metric for semiconductor patterns. The present disclosure enjoys industrial applicability in any of various industrial applications, e.g., microprocessors, smart phones, mobile phones, cellular handsets, set-top boxes, DVD recorders and players, automotive navigation, printers and peripherals, networking and telecom equipment, gaming systems, and digital cameras. The present disclosure therefore enjoys industrial applicability in any of various types of highly integrated semiconductor devices, particularly for 22 nm technology nodes and beyond.

In the preceding description, the present disclosure is described with reference to specifically exemplary embodiments thereof. It will, however, be evident that various modifications and changes may be made thereto without departing from the broader spirit and scope of the present disclosure, as set forth in the claims. The specification and drawings are, accordingly, to be regarded as illustrative and not as restrictive. It is understood that the present disclosure is capable of using various other combinations and embodiments and is capable of any changes or modifications within the scope of the inventive concept as expressed herein.

What is claimed is:

1. A method comprising:
generating, with a processor, a three dimensional (3D) simulation of semiconductor patterns;
obtaining a set of critical dimensions of distances between layers or within a layer of the 3D simulation of semiconductor patterns;
comparing the set of critical dimensions with predefined minimum dimensions;
yield scoring, with non-linear models, each of the semiconductor patterns of the 3D simulation based on the comparing step;
generating an integrated circuit (IC) model based on the yield scoring each of the semiconductor patterns of the 3D simulation, the IC yield model including optimized parameters from design and process improvements,
wherein the 3D simulation of semiconductor patterns represents an actual process outcome on a wafer.

2. The method according to claim 1, comprising:
normalizing an overall yield score to a volume of the 3D simulation of semiconductor patterns and translating into a risk factor.

3. The method according to claim 2, wherein the risk factor is a direct measure of a yield probability of the IC model.

4. The method according to claim 1, further comprising:
creating a two dimensional (2D) pattern risk assessment derived from the IC model for yield forecasting.

5. The method of claim 1, further comprising:
identifying an at risk pattern prior to processing the IC model.

6. The method according to claim 5, further comprising:
substituting the at risk pattern with an acceptable pattern, wherein the acceptable pattern has a lower risk factor than the at risk pattern.

7. The method according to claim 1, comprising:
obtaining critical dimensions by obtaining a distance between adjacent conductors.

8. The method according to claim 1, comprising:
obtaining critical dimensions by obtaining a distance between a tapered via and an adjacent metal line corner, wherein a minimum distance vector is angled in 3D space.

9. A device comprising:
a three dimensional (3D) simulator that generates a 3D simulation of semiconductor patterns;
a processor configured to:
obtain a set of critical dimensions of distances between layers or within a layer of the 3D model of semiconductor patterns;

compare the set of critical dimensions with predefined minimum dimensions; and yield score, with non-linear models, each of the semiconductor patterns of the 3D simulation based on the comparing step, wherein the 3D simulation of semiconductor patterns represents an actual process outcome on a wafer, yield score each of the semiconductor patterns of the 3D simulation to generate an integrated circuit (IC) model, and wherein the IC yield model includes optimized parameters from design and process improvements.

10. The device according to claim 9, wherein an overall yield score is normalized to a volume of the 3D simulation of semiconductor patterns and translated into a risk factor.

11. The device according to claim 10, wherein the risk factor is a direct measure of a yield probability of the IC model.

12. The device according to claim 9, wherein the processor is further configured to:

create a two dimensional (2D) pattern risk assessment derived from the IC model for yield forecasting.

13. The device according to claim 9, wherein the processor is further configured to:

identify an at risk pattern prior to processing the IC model; and substitute the at risk pattern with an acceptable pattern, wherein the acceptable pattern has a lower risk factor than the at risk pattern.

14. A method comprising:

generating, with a processor, a three dimensional (3D) simulation of semiconductor patterns representing an actual process outcome on a wafer;

obtaining a set of critical dimensions of distances between layers or within a layer of the 3D simulation of semiconductor patterns;

comparing the set of critical dimensions with predefined minimum dimensions;

yield scoring each of the semiconductor patterns of the 3D simulation based on the comparing step to generate an integrated circuit (IC) model;

normalizing an overall yield score to a volume of the 3D simulation of semiconductor patterns and translating it into a risk factor;

identifying an at risk pattern prior to processing the IC model; and substituting the at risk pattern with an acceptable pattern, wherein the acceptable pattern has a lower risk factor than the at risk pattern, wherein the risk factor is a direct measure of a yield probability of the IC model, and wherein the 3D simulation of semiconductor patterns represents the actual process outcome on the wafer.

* * * * *